UNITED STATES PATENT OFFICE.

DENNIS C. GATELY, OF NEWTOWN, CONNECTICUT.

IMPROVEMENT IN PROCESSES OF VULCANIZING CAOUTCHOUC AND OTHER SUBSTANCES.

Specification forming part of Letters Patent No. 33,303, dated September 17, 1861.

*To all whom it may concern:*

Be it known that I, DENNIS C. GATELY, of Newtown, in the county of Fairfield and State of Connecticut, have invented certain new and useful Improvements in the Process of Vulcanizing or Curing India-Rubber or Gutta-Percha; and I hereby declare that the following is a full and exact specification of the same, wherein I have set forth the nature and principles of my invention, by which it may be distinguished from all others of a similar class, together with such parts as I claim and desire to have secured to me by Letters Patent.

The usual method of curing or vulcanizing rubber or gutta-percha by what is known as the "Goodyear" process, whether by dry heat or by steam heat, in heaters or boilers or otherwise, requires a great length of time and involves a corresponding expense for its completion.

The present invention consists in a new mode of vulcanizing rubber or gutta-percha by subjecting it, after combining or compounding it in the usual manner with sulphur and other ingredients employed in vulcanization, to the action of superheated steam, either applied directly in boilers or applied by thus heating cylinders or hollow rolls, or by heating steam-pipes which convey the heat to suitable ovens, or in any other proper mode. By this process very much greater heat is obtained than by the usual mode and at a small cost, while the curing or vulcanizing is effected in much less time.

It will be obvious that there are a great variety of modes in which steam can be heated to produce superheated steam, and a great variety of methods of applying the heat thus obtained to the goods to be cured, and I therefore do not consider it necessary in this application for Letters Patent to describe all the arrangement of devices by which the steam is heated, or the precise manner in which, when so heated and converted into superheated steam, it may be applied. The most convenient mode which I practice is when india-rubber or gutta-percha goods are placed in steam-boilers. When this is the case I conduct the steam through a steam-pipe in which the pipe is coiled in four, six, or more coils. I heat these coils in a cylindrical iron stove, and as the steam passes through them the heat is raised to a great degree without increasing the pressure. Care must be taken, in conducting the steam into the vulcanizing-boiler, not to have it strike directly in great quantity upon the goods as it leaves the pipe. This I obviate by passing it through a pipe filled with numerous fine perforations.

The degree of heat used and the time during which the goods are exposed to it vary so much, according to the nature and quantity of goods to be vulcanized, that it is impossible to give any exact directions. Any competent workman, however, can easily determine it.

Having thus described my improvements, I do not claim the process well known as the "Goodyear" process of vulcanization; but

What I do claim, and desire to have secured to me by Letters Patent, is—

The process herein described of curing or vulcanizing india-rubber or gutta-percha, the same consisting in subjecting the articles to be cured or vulcanized to the action, whether direct or otherwise, of superheated steam, substantially as set forth.

DENNIS C. GATELY.

Witnesses:
ELI BARNUM,
THEO. NICHOLS.